United States Patent
Suzuki

(12) 
(10) Patent No.: US 9,215,338 B2
(45) Date of Patent: Dec. 15, 2015

(54) IMAGE FORMING APPARATUS AND IMAGE PROCESSING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Akitoshi Suzuki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1 day.

(21) Appl. No.: 13/742,807

(22) Filed: Jan. 16, 2013

(65) Prior Publication Data

US 2013/0182275 A1    Jul. 18, 2013

Related U.S. Application Data

(60) Provisional application No. 61/587,200, filed on Jan. 17, 2012.

(51) Int. Cl.
*H04N 1/00* (2006.01)
*H04N 1/32* (2006.01)

(52) U.S. Cl.
CPC ......... *H04N 1/00278* (2013.01); *H04N 1/0096* (2013.01); *H04N 1/00931* (2013.01); *H04N 1/3248* (2013.01); *H04N 2201/0094* (2013.01); *H04N 2201/3288* (2013.01)

(58) Field of Classification Search
CPC .......... H04N 1/00278; H04N 1/00931; H04N 1/0096; H04N 1/3248; H04N 2201/0094; H04N 2201/3288
USPC .................................. 358/1.1–1.9, 1.11–1.18
See application file for complete search history.

(56) References Cited

U.S. PATENT DOCUMENTS

| | | | |
|---|---|---|---|
| 2005/0286067 A1* | 12/2005 | Mellor et al. | 358/1.14 |
| 2006/0215210 A1* | 9/2006 | Sugimoto | 358/1.14 |
| 2006/0250659 A1* | 11/2006 | Contino | 358/296 |
| 2010/0220345 A1* | 9/2010 | Morikawa | 358/1.13 |

* cited by examiner

*Primary Examiner* — King Poon
*Assistant Examiner* — Ibrahim Siddo
(74) *Attorney, Agent, or Firm* — Amin, Turocy & Watson, LLP

(57) ABSTRACT

An image forming apparatus, comprising: an image reading unit configured to read the first image data printed on one side of an original and the second image data printed on the other side of the original; an image forming unit configured to carry out a image forming process for the first and second image data read by the image reading unit and a control unit configured to activate the image forming unit to carry out the image forming process for the first image data when the image reading unit reads a specified area related to the second image data.

4 Claims, 6 Drawing Sheets

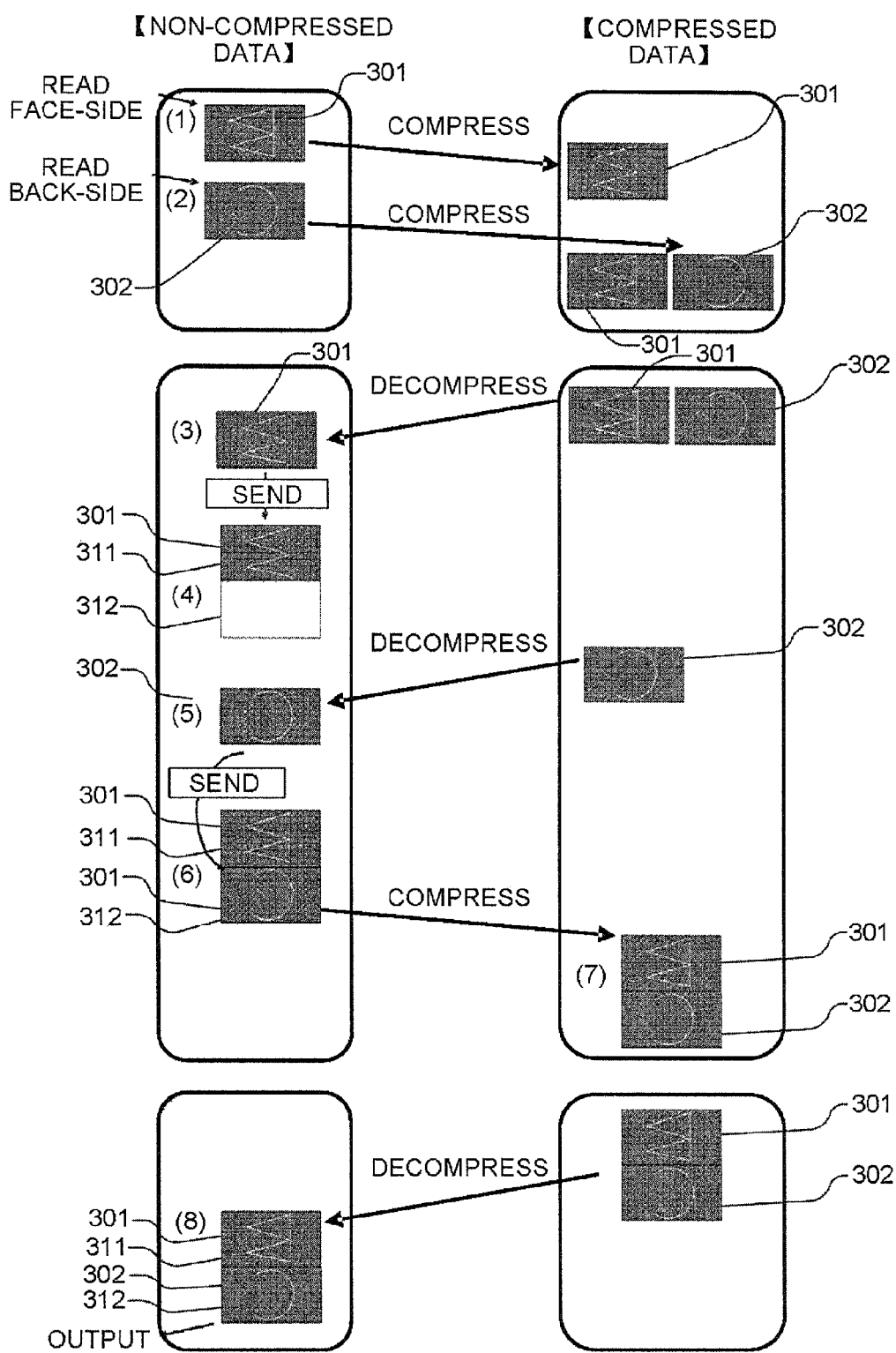

IMAGE FORMING APPARATUS AND IMAGE PROCESSING METHOD

CROSS-REFERENCE TO RELATED APPLICATIONS

This application is based upon and claims the benefit of priority from U.S. provisional application 61/587,200 filed on Jan. 17, 2012; the entire contents of which are incorporated herein by reference.

FIELD

The embodiments described herein relate to a technology for shortening the time for printing an ID card.

BACKGROUND

There is known an ID card (Identity card) print process for printing an ID card the two sides of which are printed with image data. In the ID card print process, an image reading unit reads the image data printed on the surface of an ID card, then the operator turns the ID card over to read the image data printed on the back-side of the ID using the image reading unit. Then, the image data is arranged in a storage unit in such a manner that the image data is input to the surface of a sheet, and an image forming process is carried out using an image forming unit.

However, to the moment an ID card is printed, this ID card print process takes a great amount of time as the image data stored in the storage unit needs to be arranged and an image forming process needs to be carried out by the image forming unit after the image data printed on the surface and the back-side of the ID card is read by the image reading unit. Moreover, in this ID card print process mode, when the read image data is stored and arranged in the storage unit the read image data is compressed or decompressed until the image data read in another print process mode in the same way is printed, which leads to a poor performance.

DESCRIPTION OF THE DRAWINGS

FIG. 6 is a schematic diagram illustrating an image processing related to first and second image data carried out in a storage unit according to the conventional ID card print processing.

DETAILED DESCRIPTION

According to an embodiment, an image forming apparatus, comprising: an image reading unit configured to orderly read the first image data printed on one side of an original and the second image data printed on the other side of the original; an image forming unit configured to carry out a image forming process for the first and second image data read by the image reading unit and print the formed image on a sheet and a control unit configured to activate the image forming unit to carry out the image forming process for the first image data when the image reading unit reads a specified area related to the second image data for specifying a print position for the read first image data.

Figure 1:
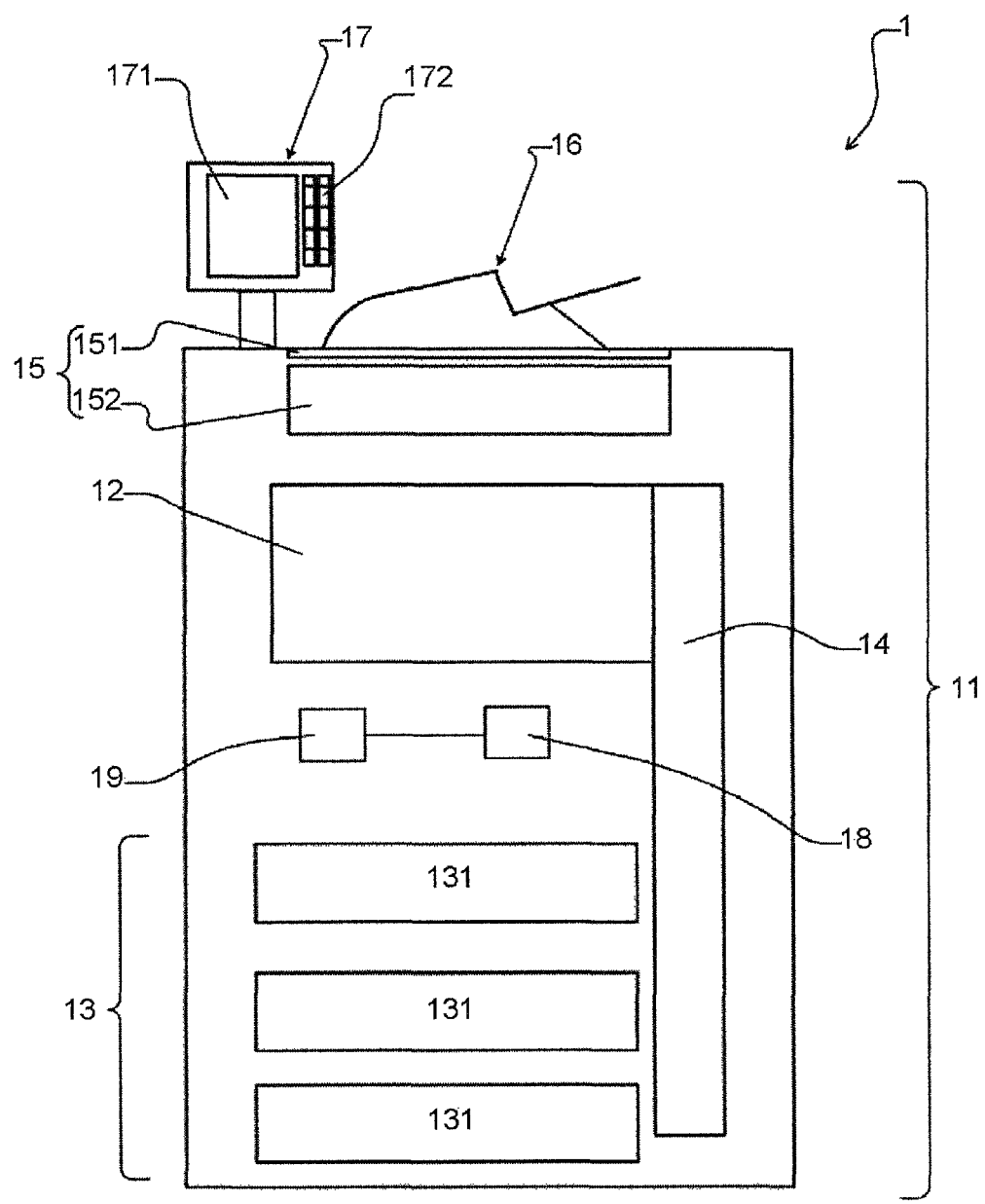
FIG. 1 is a schematic diagram illustrating an image forming apparatus according to the embodiment.

The image forming apparatus 1 provided in the embodiment is described below with reference to accompanying drawings. FIG. 1 is a schematic diagram illustrating the image forming apparatus 1 provided in the embodiment.

As shown in FIG. 1, an MFP (Multi-function peripheral) 10 serving as the image forming apparatus 1 comprises, in the main body 11 thereof, a colored image forming unit 12; a paper feeding unit 13 provided with a plurality of paper feed cassettes 131; a sheet feeding unit 14 configured to feed the sheets in the paper feed cassette 131 to the image forming unit 12; an image reading unit 15; an automatic original feeding unit 16 configured to automatically feed a sheet to the image reading unit 15; and an operation panel 17.

The image forming unit 12 prints the image data printed on an original (serving as the object to be printed) on a sheet. The image forming unit 12 comprises: a photosensitive member (not shown) which is provided with a photosensitive layer on the surface thereof and rotates anticlockwise; a charger (not shown) for charging the surface of the photosensitive layer uniformly; an exposure unit (not shown) for exposing the photosensitive layer uniformly charged by the charger to form an electrostatic latent image; a developing unit (not shown) for developing, using toner, the electrostatic latent image formed through the exposure of the exposure unit; a transfer unit (not shown) for transferring the toner image developed by the developing unit onto a sheet; and a cleaning unit (not shown) for recycling the toner which is remained on the surface of the photosensitive layer after transferring. Moreover, the image forming unit 12 further comprises a thermal fixing apparatus (not shown) for thermally fixing the toner transferred to the sheet by the transfer unit. In addition, the exposure unit exposes the photosensitive layer based on the image data of an object to be printed stored in a storage unit 19 which will be described later to form an electrostatic latent image.

The image reading unit 15 is provided with a rectangular platen glass 151 (a transparent member) and a reading unit 152 for reading the image printed on a sheet placed on the platen glass 151. The reading unit 152, which is a scanner or the like, reads the image data printed on the sheet by taking each line extending along the short side of the platen glass 151 (the length direction of the sheet) (horizontal scanning direction) as the unit. Then, the reading unit 152 reads the image printed on the sheet by taking each line extending in the length direction of the platen glass 151 (the short side direction of the sheet) (secondary scanning direction) as the unit and stores the read image in the storage unit 19 that will be described later. The reading unit 152 orderly reads the first image data 211 printed on one side of an ID card 21 and the second image data 212 printed on the other side of the ID card 21.

The operation panel 17 comprises a touch panel display unit 171 and an operation unit 172 including a numeric key, a 'Stop' key and a 'Start' key. The display unit 171 displays, for the user, operation content (e.g. prepare to read the second image data 212) and a setting on a print process such as an ID card print processing.

Figure 2:
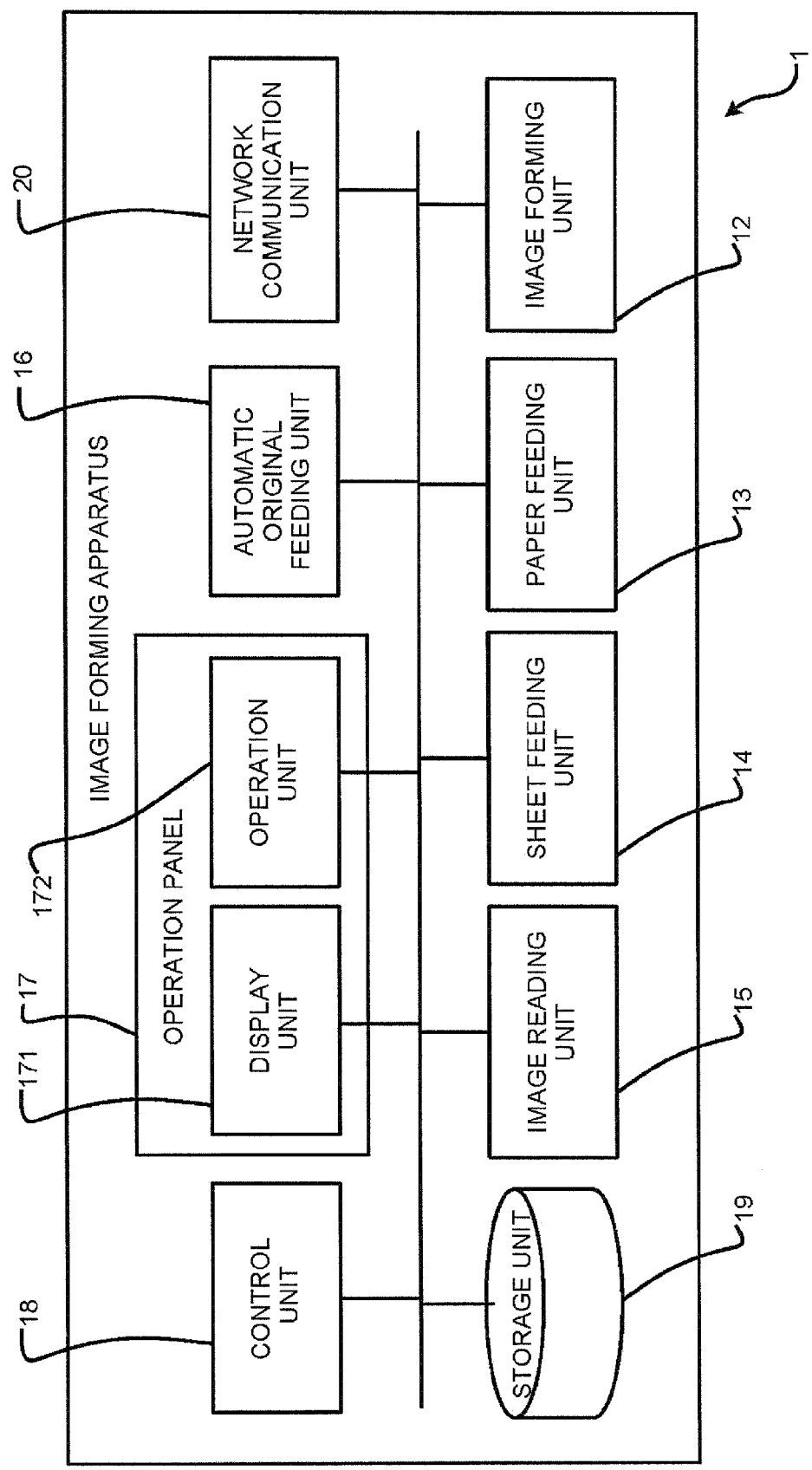
FIG. 2 is a block diagram showing the hardware of the image forming apparatus shown in FIG. 1

Next, the hardware components of the image forming apparatus 1 are described. FIG. 2 is a block diagram showing the hardware of the image forming apparatus 1.

As shown in FIG. 2, the image forming apparatus 1 comprises a storage unit 19, a control unit 18, an operation panel 17, a sheet feeding unit 14, an image forming unit 12, an image reading unit 15, an automatic original feeding unit 16, a paper feeding unit 13 and a network communication unit 20.

The storage unit 19 is a memory or an HDD (Hard Disk Drive) in which the image data read by the image reading unit 15 in lines is stored. Further, various print process (e.g. ID card print process) of the image forming apparatus 1 is stored in the storage unit 19 as well.

The control unit 18 is a CPU which controls the whole image forming apparatus 1. As stated below, in the case where an ID card print process is set, the control unit 18 activates the image forming unit 12 to carry out an image forming process on the first image data 211 when the reading unit 152 reads a specified area related to the second image data 212 for specifying a print position aiming at the read first image data 211.

The network communication unit 20 is connected with a server (not shown) through communication over a wired network.

Figure 3:
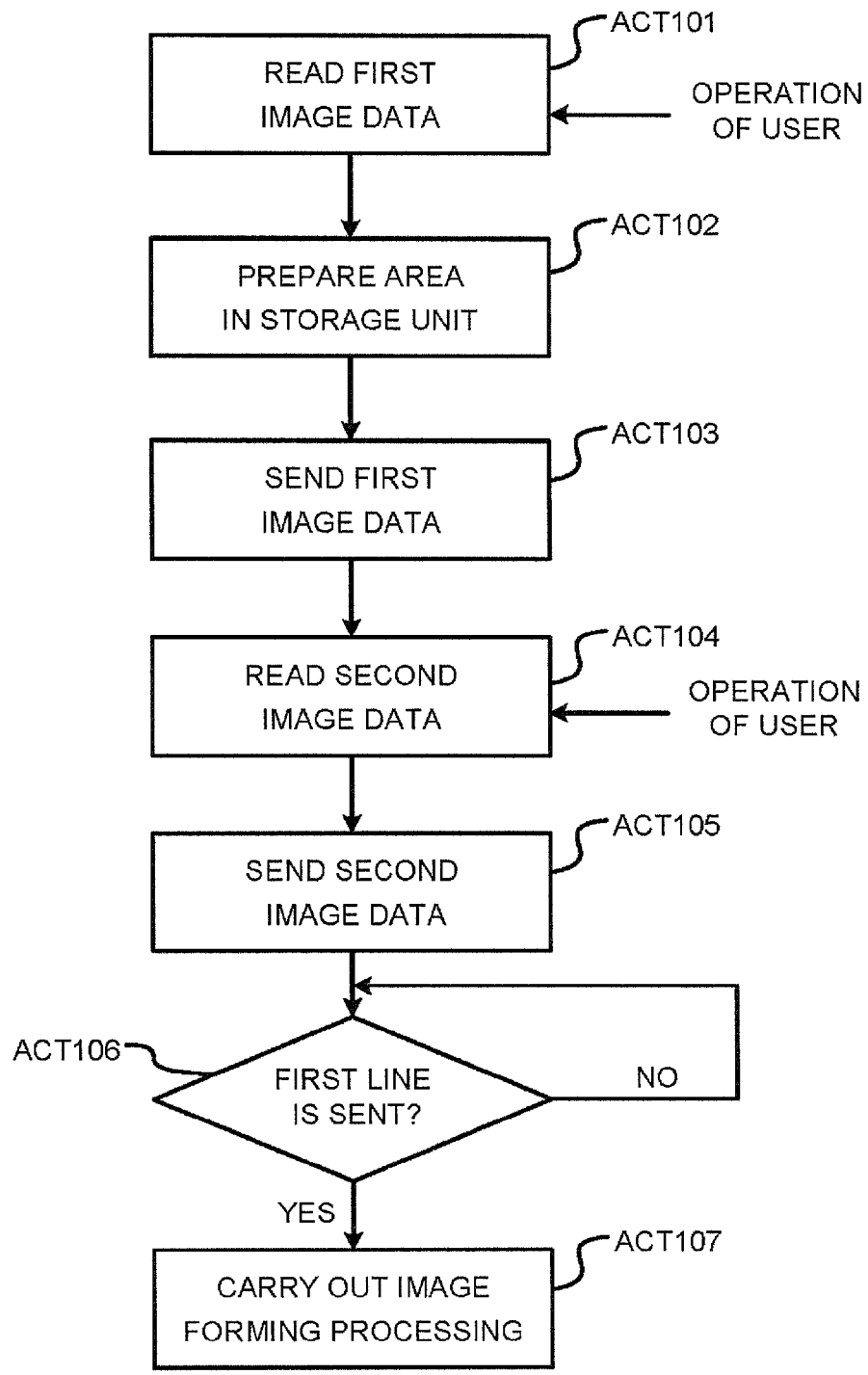
FIG. 3 is a flowchart illustrating the control of an ID card print processing by the image forming apparatus 1 shown in FIG. 1.
Figure 4:
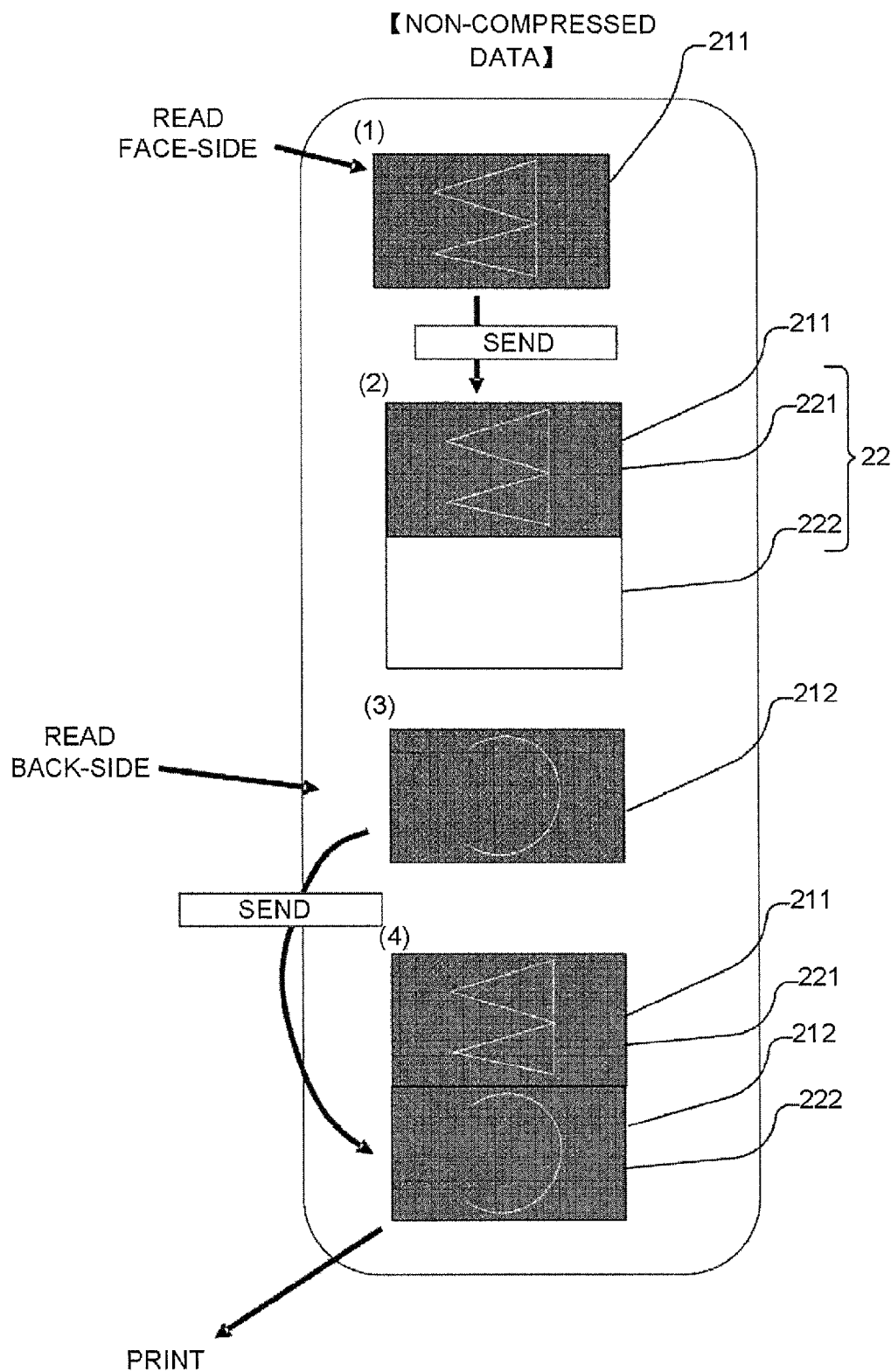
FIG. 4 is a schematic diagram illustrating, based on the control flowchart shown in FIG. 3, an image processing related to first and second image data carried out in a storage unit.

The ID card print processing method (image processing method) of the image forming apparatus 1 provided in the embodiment is described below. FIG. 3 is a flowchart illustrating the control of the image forming apparatus 1 shown in FIG. 1 on an ID card print process, and FIG. 4 is a schematic diagram illustrating, based on the control flowchart diagram of FIG. 3, an image forming process related to the first image data 211 and the second image data 212 carried out in the storage unit 19. Additionally, the first image data 211 is printed on one side (face-side) of the ID card 21, and the second image data 212 is printed on the other side (back-side) of the ID card 21.

With reference to FIG. 3 and FIG. 4, the operator makes the length direction of the ID card 21 correspond with the short side direction of the platen glass 151, places the ID card 21 in such a manner that the surface of the ID card 21 faces the platen glass 151 and selects the ID card print process displayed on the display unit 171. After determining that the operator selects the ID card print process, the control unit 18 activates the reading unit 152 to read the first image data 211 on the surface of the ID card 21 (ACT 101). After determining that the reading unit 152 stops reading the first image data 211, as shown in FIG. 4(1), the control unit 18 prepares, in the storage unit 19, an area 22 (a front area 221 needed for the image data printed on the surface of the ID card and a back area 222 needed for the image data printed on the back-side of the ID card) which is in a sheet size needed for the ID card print process (ACT 102). Then, as shown in FIG. 4(2), the control unit 18 sends the first image data 211 read by the reading unit 152 to the front area 221 in the storage unit 19 (ACT 103). After determining that the sending of the first image data 211 to the front area 221 is ended, the control unit 18 displays content 'ready to read second image data 212' (ready to carry out a reading process on second image data 212) on the display unit 171. As an example of the content displayed on the display unit 171, content 'set second image data 212 on the platen glass 151 please' is displayed on the display unit 171.

The operator turns over the ID card 21 so that the back-side of the ID card faces the platen glass 151, and then inputs content 'ready to read second image data 212' to the display unit 171 or the operation unit 172. After acquiring input information such as 'ready to read second image data 212', the control unit 18 activates the reading unit 152 to start an image reading process on the second image data 212 (ACT 104). Then, the control unit 18 orderly sends the second image data 212 read by the reading unit 152 to the back area 221 in the storage unit 19 (ACT 105). After determining that a specified area related to the second image data 212 which is arranged in the front area 221 in the storage unit 19 to specify a print position aiming at the first image data 211 is transmitted to the back area 222 in the storage unit 19 (the reading unit 152 reads a specified area related to the second image data 212 for specifying a print position for the read first image data 211), the control unit 18 activates the image forming unit 12 to print the first image data 211 on the sheet (image forming processing) (ACT 106 YES, ACT 107). Here, the specified area related to the second image data 212 refers to an area related to the image data in the first line of the second image data 212.

The actions carried out by the control unit 18 after the image data 212a in the first line of the second image data 212 (the image data in a specified area related to the second image data 212) is transmitted to the back area 222 are described below in detail.

After determining that the image data 212a in the first line of the second image data 212 is transmitted to the back area 222, the control unit 18 activates the charger to charge the surface of the photosensitive member to form a photosensitive layer. The control unit 18 activates the exposure unit based on the first image data 211 stored in the front area 221 and the image data 212a in the first line of the second image data 212 to expose the photosensitive layer to form an electrostatic latent image. Then, the control unit 18 activates the reading unit 152 to carry out an image reading process on the data in the second and the following lines of the second image data 212 while carrying out the electrostatic process. Moreover, the control unit 18 transmits the image data 212a in the first line of the second image data 212 read by the reading unit 152 to the back area 222 and activates the exposure unit to form an electrostatic latent image aiming at each line of second image data 212 transmitted to the back area 222.

After determining that the second image data 212 is read by the reading unit 152 and is all transmitted to the back area 222, the control unit 18 activates the developing unit to develop, using a toner, the electrostatic latent images related to the first image data 211 and the second image data 212. Then, the control unit 18 transfers the developed toner image onto the sheet using the transfer unit and thermally fixes, using the thermal fixer, the toner image transferred onto the sheet.

In this way, by developing, using the developing unit, the second image data 212 transmitted to the back area 222 in the storage unit 19, the image forming apparatus 1 provided in the embodiment effectively prevents the problem that only the first image data 211 is printed on the sheet and discharged.

Moreover, by carrying out an electrostatic latent image forming processing on the first image data 211 and the image data 212a in the first line of the second image data 212 using the image forming unit 12 during the period in which the reading unit 152 reads the second image data 212, the image forming apparatus 1 provided in the embodiment makes an effective use of the time during which the reading unit 152 reads the second image data 212.

Moreover, as the image forming apparatus 1 provided in the embodiment reads the image data in the second and the following lines of the second image data 212 using the reading unit 152 and orderly carries out an image forming process on the read image data during the period in which the image forming unit 12 forms electrostatic latent images for the first image data 211 and the image data 212a in the first line of the second image data 212, the time needed for printing the first image data 211 and the second image data 212 on the sheet is shortened.

In addition, as the image forming apparatus 1 provided in the embodiment activates the exposure unit to form an electrostatic latent image after the reading unit 152 reads the image data 212a in the first line of the second image data 212, the position relationship between the electrostatic latent images related to the first image data 211 and the second image data 212 can be explicitly specified at least. That is, the configuration relationship between the first image data 211 and the second image data 212 is specified by the distance between the image data in the last line of the first image data 211 and the image data in the first line of the second image data 212. Therefore, by regulating the position relationship of the image data in the storage unit 19, the exposure position of the second image data 212 can be specified at the position that not to be overlapped with the first image data 211.

Figure 5:
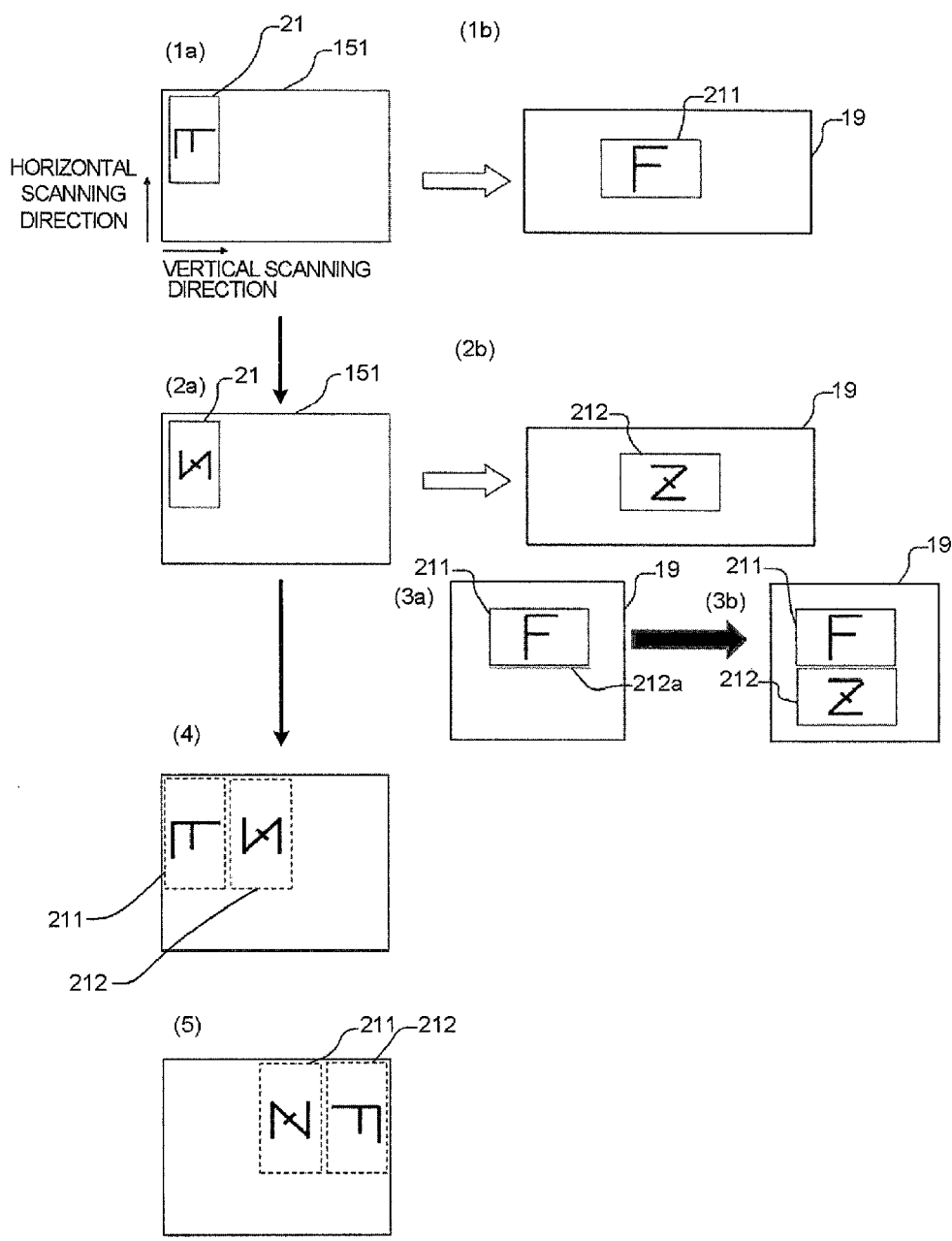
FIG. 5 is a schematic diagram illustrating an arrangement processing and an image forming processing related to first and second image data carried out in a storage unit.

Next, the configuration of the first image data 211 and the second image data 212 in the storage unit 19 and the exposure process on the photosensitive layer are described. FIG. 5 is a schematic diagram illustrating the configuration of the first and second image data 211, 212 in the storage unit 19 and the exposure process.

As shown in FIG. 5(1a), the operator places the ID card 21 in such a manner that the first image data 211 of the ID card 21 faces the platen glass 151, and the control unit 18 activates the reading unit 152 to read the first image data 211. As shown in FIG. 5(1b), the control unit 18 sends the first image data 211 read by the reading unit 152 to the storage unit 19 and stores the first image data in the front area 221 in the storage unit 19. As shown in FIG. 5(2a), the operator places the ID card 21 in such a manner that the second image data 212 of the ID card 21 faces the platen glass 151, the control unit 18 activates the reading unit 152 to read the second image data 212 after receiving information 'ready to read the second image data 212'. As shown in FIG. 5 (2b), the control unit 18 sends the second image data 212 read by the reading unit 152 to the storage unit 19 and stores the second image data 212 in the back area 222 in the storage unit 19. Here, as shown in FIG. 5(3a), the control unit 18 sends the image data in each line of the second image data 212 to the storage unit 19. Moreover, after determining that the first image data 211 and the image data 212a in the first line of the second image data 212 are transmitted to the storage unit 19, the control unit 18 starts an image forming process using the image forming unit 12. The image forming unit 12 is activated to arrange the first image data 211 and the second image data 212 on the photosensitive member to develop a toner image. More specifically, the control unit 18 activates the exposure unit to sequentially send, starting from the last address, the image data 211 and 212 stored in the storage unit 19 to the exposure unit to form electrostatic latent images on the photosensitive member. The electrostatic latent images are formed on the photosensitive member in such a manner that the image data 211 and 212 stored in the storage unit 19 are horizontally flipped. The control unit 19 activates the developing unit and the transfer unit to form toner images on the photosensitive layer and transfers the toner images onto the sheet. The control unit 18 activates the thermal fixing apparatus to thermally fix the toner images transferred onto the sheet; as shown in FIG. 5(4), paper is discharged in a facedown state (paper is discharged after being subjected to an image forming process). Then, if the user manually takes out the discharged sheet and makes the surface of the paper face up, then the sheet presents the state shown in FIG. 5(5). Additionally, FIG. 5(1a) and FIG. 5(2a) are diagrams showing the state (facedown state) of the sheet placed on the platen glass 151 when observed from the top, and FIG. 5(3b) is a diagram showing the configuration of the first image data 211 and the second image data 212 in the storage unit 19.

In this way, in the ID card copy and print process of the image forming process described herein, when the first and second image data 211 and 212 read by the reading unit 152 are arranged in the storage unit 19, only the first and second image data 211 and 212 are rotated, and electrostatic latent images can be immediately formed on the exposure layer with respect to the image data in each line of the second image data 212 read by the reading unit 152.

Next, the conventional ID card print process and the feature of the ID card print process related to the image forming apparatus 1 provided in the embodiment are described. FIG. 6 is a schematic diagram illustrating an image process related to first image data and second image data carried out in a storage unit according to the conventional ID card print process.

In the conventional ID card print process, after an operator sets an ID card print process, a control unit (not shown) activates an image reading unit (not shown) to read the first image data 301 printed on an ID card 300 (the image data on the surface of the ID card), and compresses and stores the read image data into a storage unit (stores the first image data 301 into the storage unit as a compressed data), as shown in FIG. 6(1). Then, the operator turns over the ID card 300; as show in FIG. 6(2), the control unit compresses and records the second image data 302 related to the ID card 300 (the image data on the back-side of the ID card 300) read by the image reading unit in the storage unit. As shown in FIG. 6(3), the control unit decompresses the first image data 301 to recover the original image data; as shown in FIG. 6(4), areas (front area 311 and back area 312) in the size of a paper needed for the configuration of the first image data 301 and the second image data 302 in the storage unit are prepared, and the first image data 301 is configured in the front area 311. Then, as shown in FIG. 6(5) and FIG. 6(6), the control unit decompresses the second image data 302 (change the second image data 301 to non-compressed data) and configures the second image data 302 in the prepared back area 312. As shown in FIG. 6(7), the control unit compresses the first image data 301 configured in the front area 311 and the second image data 302 configured in the back area 312 and stores the compressed image data in the storage unit. Then, the control unit decompresses the compressed first and second image data 301 and 302 stored in the storage unit and activates an image forming unit (not shown) to print the first and second image data 301 and 302 on a sheet.

In the conventional ID card print process, the first and second image data 301 and 302 read by the reading unit are compressed and then stored in the storage unit, then decompressed in the storage unit to determine a related configuration, and sequentially compressed again and finally decompressed again when an image forming processing is carried out by the image forming unit. Thus, in the conventional ID card print process, the read first and second image data 301 and 302 are compressed and decompressed for many times, as a result, a great amount of time is spent on the process carried out after the second image data 302 is read by the image reading unit.

Further, in the conventional ID copying and print process, during the period starting from the moment the image reading unit stops reading the first image data 301 and ending at the moment the image reading unit stops reading the second image data 302, the image data is not configured in the storage unit, thus, the conventional ID copy and print process fails to make an effective use of the time during which the second image data 302 is read, when compared with the ID card print process of the image forming apparatus 1 described in this embodiment.

On the contrary, as stated above, in the ID card print process of the image forming apparatus 1 described in this embodiment, the image data read by the reading unit 152 is neither compressed nor decompressed (just be kept as non-compressed data), and the period during which the second image data 212 is read by the reading unit 152 is effectively utilized, thus, the time needed for the ID card print process is greatly shortened. As a result, the image forming apparatus 1 provided in the embodiment carries out an ID copy and print process effectively and is therefore improved in performance. Further, the image forming apparatus 1 provided in the embodiment advances FCOT (First Copy Of Time) of the first ID card.

In the embodiment described herein, the ID card 21 is described as an original to be printed by the image forming apparatus 1, however, the present invention is not limited to this, the object to be printed by the image forming apparatus 1 may be any original that has the first image data 211 on one side (face-side) and the second image data 212 on the other side (back-side).

Moreover, in the embodiment described herein, an area related to the image data 212a in the first line of the second image data 212 is described as a specified area related to the second image data 212, however, the present invention is not limited to this, the area may be any area that is related to the image data of the second image data 212 and capable of specifying the print position of the second image data 212 with respect to the first image data 211

In the embodiment described herein, the functions of the apparatus are prerecorded in the apparatus, however, the present invention is not limited to this, the same functions may also be downloaded to the apparatus from a network communication unit 20 or stored in a recording medium and then installed in the apparatus. The recording medium may be any recording medium (e.g. CD-ROM) that is capable of storing programs and readable to the apparatus. Further, the functions achieved by an installed or downloaded program can also be achieved through cooperation with an OS (Operating System) installed in the apparatus.

As stated above, according to the technology described herein, the time needed to print the ID card 21 can be shortened.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
an image reading unit configured to read an entirety of the first image data printed on one side of an original before reading the second image data printed on the other side of the original and configured to start to read the second image data based on an operation input by an operator;
an image forming unit that includes a photoreceptor and is configured to carry out an image forming process for page image data to be printed onto one side of a sheet including both of the first and second image data read by the image reading unit;
a control unit configured to activate the image forming unit to carry out the image forming processing for the page image data when the image reading unit reads image data in the first line of the second image data; and
a storage unit configured to store the first and second image data read by the image reading unit, wherein
the control unit arranges the image data in the first line of the first and second image data in the storage unit so that the image data in the first line of the second image data locates after a last line of the first image data in a serial signal direction before the image forming unit carries out the image forming process.

2. The image forming apparatus according to claim 1, further comprising:
a display unit configured to display operation content, wherein
the control unit displays an information that the reading process for the second image data is prepared after the image reading unit reads the first image data.

3. An image processing method, comprising:
reading an entirety of the first image data printed on one side of an original before starting reading of the second image data printed on the other side of the original based on an operation input by an operator by an image reading unit;
carrying out the image forming processing with a photoreceptor for the page image data to be printed onto one side of a sheet including both of the first and second image data by an image forming unit when the image reading unit reads image data in the first line of the second image data; and
storing the first and second image data read by the image reading unit, including arranging the image data in the first line of the first and second image data when storing the first and second image data so that the image data in the first line of the second image data locates after a last line of the first image data in a serial signal direction before the image forming unit carries out the image forming process.

4. The image processing method according to claim 3, further comprising:
displaying an information that the reading processing for the second image data is prepared after the image reading unit reads the first image data on a display unit.

* * * * *